Aug. 31, 1965  F. C. BEEKLEY  3,203,289
APPARATUS FOR GROOVING CARDS AND THE LIKE
Filed April 7, 1961  3 Sheets-Sheet 1
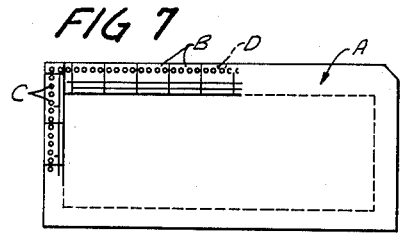
FIG. 7
FIG. 5
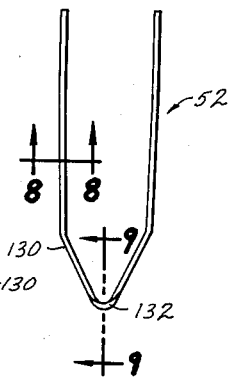
FIG. 8
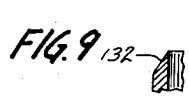
FIG. 9
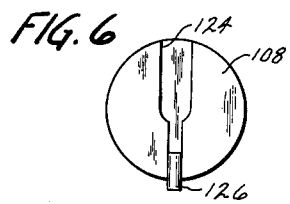
FIG. 6
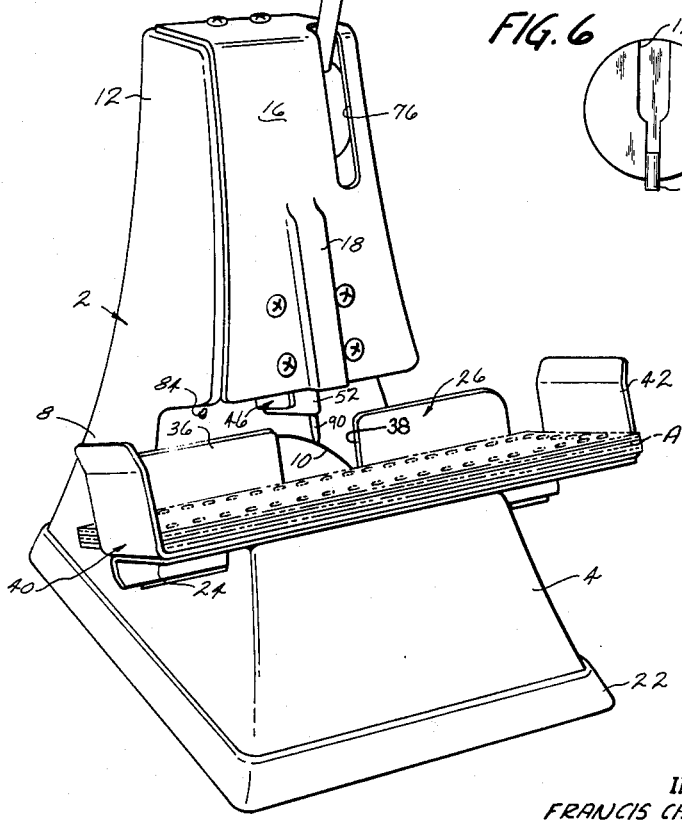
FIG. 1
INVENTOR.
FRANCIS CHEYNEY BEEKLEY
BY Lindsey, Prutzman and Hayes
ATTORNEYS

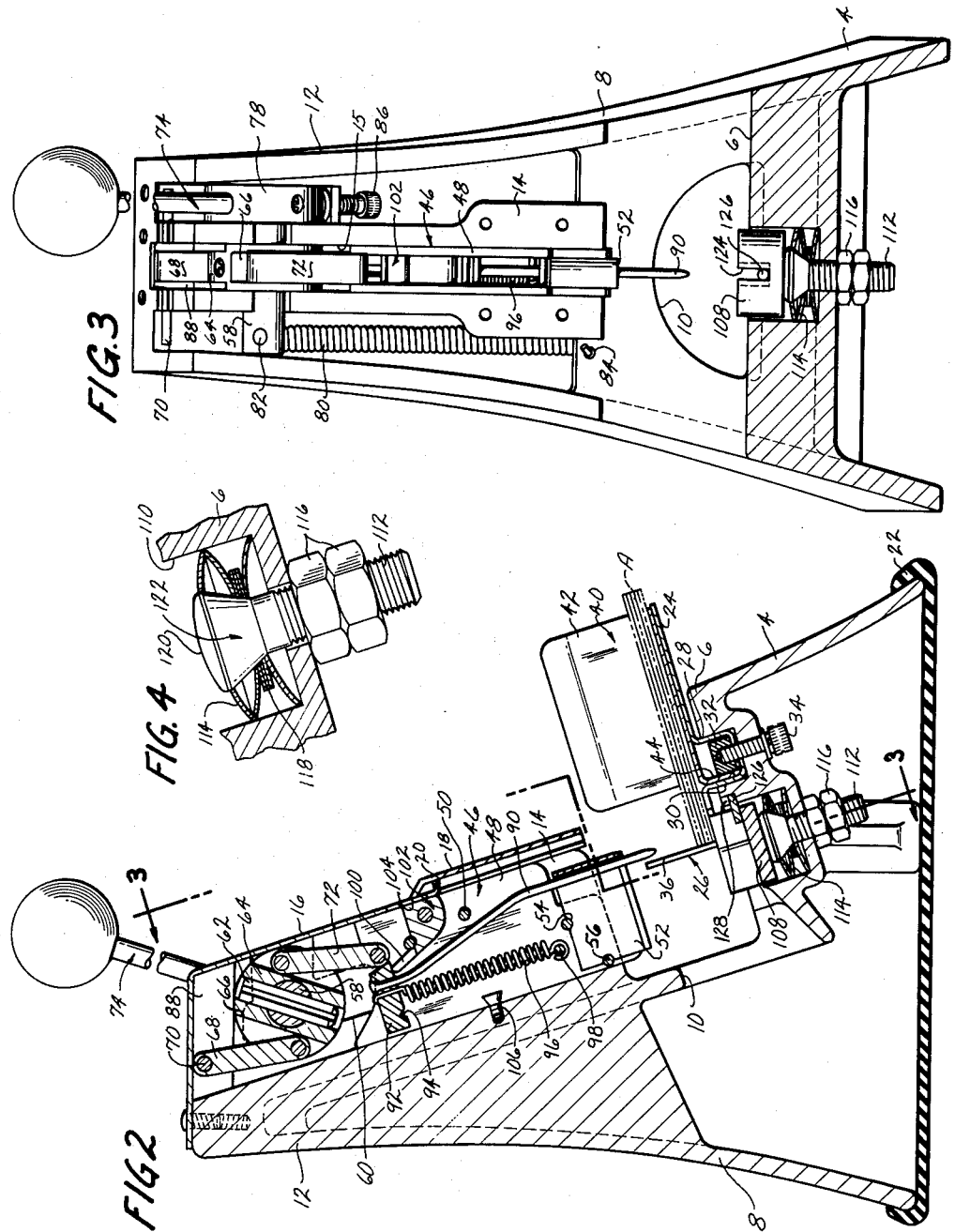

Aug. 31, 1965 F. C. BEEKLEY 3,203,289
APPARATUS FOR GROOVING CARDS AND THE LIKE
Filed April 7, 1961 3 Sheets-Sheet 3
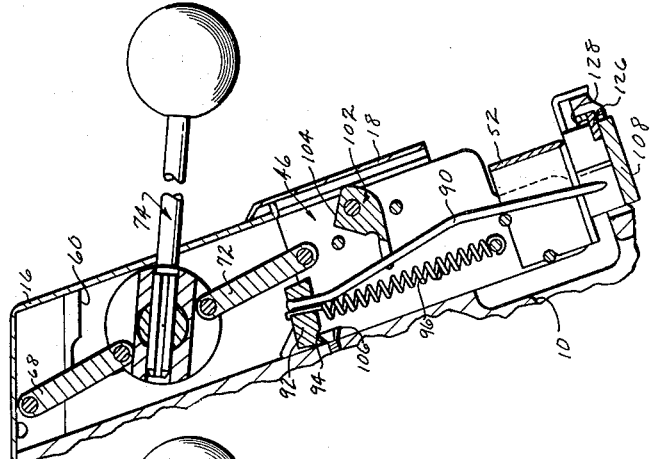
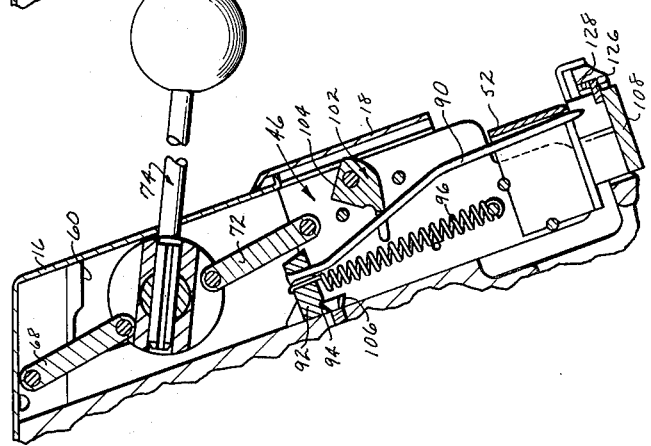
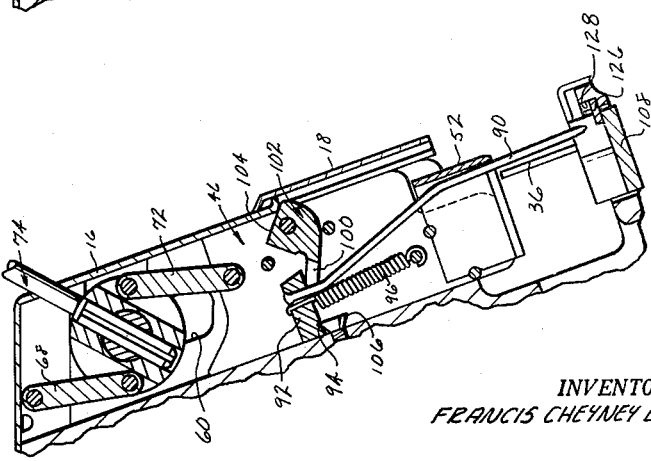
INVENTOR.
FRANCIS CHEYNEY BEEKLEY
BY Lindsey, Prutzman and Hayes
ATTORNEYS

United States Patent Office 3,203,289
Patented Aug. 31, 1965

3,203,289
APPARATUS FOR GROOVING CARDS
AND THE LIKE
Francis Cheyney Beekley, West Hartford, Conn., assignor to The Beekley Corporation, West Hartford, Conn., a corporation of Connecticut
Filed Apr. 7, 1961, Ser. No. 101,527
12 Claims. (Cl. 83—134)

The present invention relates to apparatus for grooving or notching cards, coupons, and the like, for use in mechanical and semi-mechanical card-sorting operations.

The present apparatus is suitable for notching out or grooving openings in a stack of cards of the type used in mechanical or semi-mechanical card-sorting operations. Generally, these cards have a plurality of holes spaced about the side margins and the edges of the cards are grooved or notched at selected holes to record the information to be coded upon the card.

It is the aim of the present invention to provide improved and highly effective apparatus for grooving or notching cards and the like wherein the cutting action is smooth, rapid and efficient and wherein the chips of material cut from the card are effectively and quickly discharged from the cutting area.

Another aim is to provide card-grooving apparatus having enhanced operating characteristics wherein improved life and protection are afforded for the cutting blade and wherein the cards to be grooved are precisely aligned for the cutting operation to produce a clean and precise notch.

Other objects will be in part obvious and in part pointed out more in detail hereinafter.

The invention accordingly consists in the features of construction, combination of elements and arrangement of parts which will be exemplified in the construction hereinafter set forth and the scope of the application which will be indicated in the appended claims.

In the drawings:

FIG. 1 is a front perspective view of an embodiment of apparatus for grooving cards and the like constructed in accordance with the present invention;

FIG. 2 is a longitudinal section of the apparatus of FIG. 1;

FIG. 3 is a front section of the apparatus generally along the line 3—3 of FIG. 2 with the cover plate and base closure pad removed;

FIG. 4 is an enlarged fragmentary section of the platen support assembly;

FIG. 5 is an enlarged bottom view of the cutter blade;

FIG. 6 is a plan view of the platen;

FIG. 7 is a plan view of a card of the type used in the apparatus;

FIG. 8 is a fragmentary section of the cutter blade along the line 8—8 of FIG. 5;

FIG. 9 is an enlarged fragmentary section of the cutter blade along the line 9—9 of FIG. 5; and FIGS. 10–12 are fragmentary longitudinal sections showing the operating mechanism of the apparatus in various positions during operation.

Briefly illustrating a sample of the cards, coupons and like material of the type upon which the present apparatus is designed to operate, illustrated in FIG. 7 of the drawings is a card of the type widely employed which is generally designated by the numeral A. Along the side margins of the card are a plurality of code sections B for recording various elements of information and which are subdivided into several subsections each of which contains a hole C. By grooving or notching out one of these holes C in the section B according to a predetermined code, the desired information is recorded upon the card for future mechanical sorting operations. The notched or grooved chip cut by the apparatus is indicated in dotted line by the letter D.

Now referring in detail to the apparatus in the drawings, there is illustrated a preferred embodiment constructed in accordance with the present invention which includes an integrally formed hollow casing or housing 2 comprised of a base portion 4 providing a transverse table 6 along its forward side, an upstanding neck portion 8 rearwardly of the table 6 with a forwardly facing aperture 10 therein, and a head portion 12 which in part overlies the table 6 and has a pair of vertical ribs 14 defining a vertically extending channel or guideway 15. Closing the top and front sides of the head portion 12 is a cover plate 16 which is provided with an outwardly extending rib or groove 18 in the lower portion of its front face providing a channel registering with the channel 15 defined by the ribs 14; also provided is a lug 20 at the upper end of the groove 18, all for a purpose to be described more fully hereinafter. A base closure pad 22 of rubber or other resilient material serves to close the base of the housing 2 and provide a non-marring and non-skidding base surface for the apparatus.

Mounted on the table 6 of the housing is a carrier platform assembly provided by a front platform member 24 and a rear platform member 26 having overlying L-shaped leg portions 28, 30, which are locked in a transverse groove in the table 6 by the platform bar 32 and screws 34. The rear platform member 26 has an upstanding rear wall 36 against which the cards A to be punched seat themselves by gravity. As best shown in FIG. 1, the rear platform member is notched out at its center portion, as indicated by the numeral 38, in both the rear wall and base platform for a purpose to be described more fully hereinafter. Slideably mounted upon the platform assembly is the card carrier 40 which has upstanding side walls 42 and a depending leg 44 along its rear side which is slideably guided between the bar 32 and leg portion 30 for movement transversely of the housing to bring various portions of the card into operative position.

Now referring to the head portion 12 of the housing, slideably mounted in the channel or guideway 15 provided by the ribs 14 is the ram 46 which is in the form of a pair of plates 48 joined in spaced relationship by pins or rivets 50. A generally V-shaped cutter blade 52 is detachably mounted at the lower end of the ram 46 by snap-fitting notches 54 therein onto the pins 56.

The ram 46 is reciprocated in the channel 15 with respect to the table 6 by a toggle-like drive mechanism employing an operating shaft 58 which floats in vertically elongated notches 60 in the ribs 14. Mounted on the operating shaft 58 between the ribs 14 by the pin 62 is a drive collar 64 which has a pair of grooves or recesses 66 milled therein extending transversely of its axis. The drive collar 64, and thereby the operating shaft 58, are supported in the housing 2 by the upper toggle link 68 which is pivotally connected at one end in one of the grooves 66 of the drive collar 64 and at its other end to the shaft 70 which is seated in notches in the upper end of the ribs 14. A lower toggle link 72 is pivotally connected at one end in the other of the grooves 66 in the drive collar 64 and at its other end to the upper portion of the ram 46.

The drive mechanism is actuated by the operating handle 74 which extends through a vertically extending slot 76 in the cover plate 16 and is threadedly engaged in the collar 78 on the operating shaft 58. The spring 80, which is fastened at one end to pin 82 on the operating shaft 58 and at its other end in aperture 84 in the neck portion 8 of the housing, provides the tension for the toggle-like mechanism.

As the operating handle 74 is pulled downwardly, the operating shaft rotates and floats downwardly in the elongate notches 60 of the ribs causing the lower toggle link 72 to extend and drive the ram 46 downwardly towards the table 6. Movement past center is prevented by interception of the socket head screw 86 on the collar 78 by a screw (not shown) on the housing. Also mounted on the shaft 70 between the ribs 14 are a pair of plates 88 which provide an abutment or stop for the drive collar 64 in its upper or at-rest position and distributes the stress across the top wall of the cover plate 16.

Also carried by the ram 46 is an elongate pilot pin 90 which extends through and closely hugs the inside surface at the apex or crown of the cutter blade 52. At its upper end, the pilot pin 90 is provided with an enlarged head 92 in the form of a generally rectangular block which extends rearwardly adjacent the rear wall of the channel 15 and which is provided with a transverse notch 94 in its lower surface adjacent its rearward end. Attached at one end to the center portion of the pilot pin head 92 is a spring 96 which is attached at its other end to pin 98 at the bottom portion of the ram 46.

As seen in FIG. 2, pilot pin head 92 is engaged by the spaced fingers 100 of the pivotally mounted lever 102. In the elevated or at-rest position, the flat surface 104 of the lever bears against the guide surface provided by the inside of the cover plate 16 and holds the pilot pin 90 in elevated position against the biasing pressure of the spring 96. As the ram 46 moves downwardly during operation, the lever 102 is pivoted by the pressure of spring 96 into the groove 18 of the cover plate 16 so as to release the pilot pin 90 and allow it to move rapidly downwardly under the spring pressure towards the cards A in the card carrier 40, as illustrated in FIG. 10. The pin 90 thus rapidly precedes the descent of the cutter blade 52 for the purpose of locating itself in the hole C of the cards A to be punched or grooved to align the cards and hold them steady for the cutting blade.

After the pin 90 has located itself in the hole C of the cards in the carrier 40, the notch 94 in the bottom surface of the pilot pin head 92 engages with the head of the screw 106 which is fastened into the housing 2 at the rear of channel 15. The continuing descent of the ram 46 results in elongation of the spring 96 and in the creation of a clockwise pivotal force upon the pin 90 since one side of the head 92 is engaged by the screw 106 which serves as a fulcrum point. This pivotal force is resisted by the engagement of the lower end of the pilot pin in the hole C of the cards until the cutter blade 52 notches the card and releases the pin, thus causing the notched-out chips D to be propelled rearwardly into the aperture 10 of the neck portion 8 and hence into the hollow base portion 4. After the cards have been cut and as the ram 46 is moving upwardly, the lever 102 is pivoted clockwise by the lug 20 at the upper end of the groove 18 to engage the pilot pin head 92 and retract the pilot pin 90 against the biasing pressure of spring 96.

The cutter blade 52 operates against a cylindrical platen 108 of hard alloy steel which is resiliently supported in a cylindrical recess 110 in the table 6 at the notched-out portion 38 of the platform member 26 with its upper surface in substantial alignment with the surface of the platform member 26. At its rearward end, the recess 110 opens into the hollow neck of the housing.

As best shown in FIG. 4, the resilient support for the platen 108 is provided by the platen support screw 112 which is spring-loaded by the convex or generally semi-spherical resilient washers 114, commonly known as "Bellville" washers. As will be readily appreciated, the degree of spring-loading is easily varied by tightening the screw 112 in the lock nuts 116, and spacers or shims 118 may also be employed to insure proper spacing. The convex or generally semi-spherical end portion 120 on the head 122 of the platen support screw 112 provides only a small area of contact with the bottom surface of the platen 108 and permits rocking adjustment of the platen thereon to insure proper alignment with the cutting edge of the cutter blade 52 at all times.

As best illustrated in FIG. 6, in the top surface of the platen 108 there is provided a groove or channel 124 which extends rearwardly of the apparatus and into which the end of the pilot pin 90 projects. The rearward portion of the groove 124 is enlarged to accommodate the chips which may fall thereinto during ejection by the pilot pin 90. Fixed in the front end of the platen groove 124 to insure its proper alignment is an aligning pin 126 which projects into a locating groove 128 in the table 6.

Referring now to the cutter blade in detail as shown clearly in FIGS. 5, 8 and 9, the cutting edge 130 of the generally V-shaped blade is beveled outwardly except at the apex or nose where the bevel is reversed and it is beveled inwardly, as indicated by the numeral 132. This configuration has proven particularly important since the blade should push the cards forwardly as its cuts to prevent cutting the cards too deeply and reaming out of the hole which is being notched. Since the pilot pin 90 closely hugs the cutting edge at the apex or nose of the blade, the apex of the cutting blade with its reverse or inward bevel 132 slides down between the pilot pin 90 and the forward edge of the hole in the cards.

Now referring in detail to the operation of the illustrated embodiment, the cards A to be grooved are inserted into the carrier 40 and seat themselves by gravity against the rear wall 36. The carrier 40 is then slid transversely of the apparatus to place the hole C to be grooved or notched in substantial alignment with the pilot pin 90.

The initial or at-rest position of the drive and cutting mechanism is illustrated in FIG. 2. As the operating handle 74 is depressed, the ram 46 is driven downwardly towards the cards A through the toggle drive mechanism. As the ram 46 moves downwardly, the lever 102 slides along the inside of the cover plate 16 until it moves past the lug 20 at which time it is pivoted in a counterclockwise fashion into the grooves 18 in the cover plate 16, thus releasing the pilot pin head 92 from the lever fingers 100. As shown in FIG. 10, the pilot pin 90 then rapidly descends under pressure of the spring 98 at a faster rate than the cutter blade 52 and passes through the hole C of the cards A to be grooved or notched to positively align and hold the cards in position for the cutter blade. After the pin has passed through the cards A and into the platen groove 124, the screw 106 engages in the notch 94 of the pilot pin head 92 so that as the ram 46 continues its downward movement, the spring 96 is elongated and exerts a clockwise biasing pressure upon the pilot pin 90 which holds the cards A tightly against the rear wall 36 of the carrier platform.

The cutter blade 52 then cuts through the cards until it reaches the top surface of the platen 108 as indicated in FIG. 11, after which the pilot pin 90 is released and swings rearwardly as indicated in FIG. 12 to eject the notched-out chips into the aperture 10 in the neck portion 8 of the housing. Upon release of the downward pressure upon the operating handle 74, the spring 80 returns the operating mechanism to the initial position in FIG. 2 and as the ram 46 moves upwardly, the lever 102 is pivoted by the lug 20 in a clockwise fashion to cause it to engage the pilot pin head 92 and retract the pin.

As will be readily appreciated, excessive downward drive force of the ram 46 and cutter blade 52 is absorbed by the resilient platen support provided by the convex washers 114 so as to prevent damage to the cutting edge. In this fashion, a hard platen can be employed to insure clean and precise cutting of all the cards, and the resistance or tension of the preloaded convex washers can be adjusted to provide a firm cutting surface while simultaneously providing means for absorption of excessive drive force. Any misalignment between the cutting edge of the blade 52 and the platen 108 is readily and quickly compensated by rocking of the platen upon the convex head of the platen support screw 112.

The chips D collect in the hollow base portion 4 and may be periodically cleaned out by removing the rubber base closure pad 22.

As will be apparent to persons skilled in the art, various modifications and adaptations of the structure above described will become readily apparent without departure from the spirit and scope of the invention, the scope of which is defined in the appended claims.

I claim:

1. In apparatus for grooving cards and the like, a housing; a metal platen having a cutting face; means resiliently supporting said platen on said housing; a ram reciprocably mounted in the housing for movement towards said platen; a generally V-shaped cutter blade on said ram having a cutting edge movable into engagement with said cutting face of the platen for cutting of cards disposed thereon; pilot pin means carried by said ram for aligning cards to be cut and for ejection of the chips formed by the cutting operation; and drive means for reciprocating said ram to drive said cutter blade through cards carried on said platen, said platen supporting means absorbing excessive drive force to prevent damage to said cutter blade and permitting self-alignment of the platen with said cutting face disposed substantially parallel to said cutting edge of the blade.

2. The device of claim 1 wherein said pilot pin means includes an elongate pilot pin in said ram extending through said cutter blade and engageable in the holes of cards to be grooved for alignment thereof, a spring having one end engaged with the upper portion of said pilot pin and the other end attached to the lower portion of said ram; said spring biasing said pilot pin downwardly towards the platen and supporting the pin for pivotal movement relative to the ram, a lever engageable with said pilot pin for retraction thereof against the spring pressure in the at-rest position and disengageable during reciprocation of the ram towards said platen to release said pin and allow it to rapidly precede the cutter blade and seat in the hole of cards to be grooved, and stop means engageable with the upper portion of the pilot pin after it has seated in the hole of the cards to elongate the spring during further reciprocation of the ram and produce pivotal movement of the lower end of the pilot pin away from the platen for ejection of the card chips notched out by the cutting blade.

3. The device of claim 1 wherein said platen resilient supporting means includes a support member fastened to said housing and having an enlarged head upon which said platen is seated, and a plurality of resilient convex members seated on said support member, said convex members being compressible in response to pressure upon the platen and thereby the support member to absorb excessive drive force and prevent damage to said cutter blade.

4. The device of claim 3 wherein said enlarged head of the support member is convex for ready self-alignment of said platen with the cutting edge of the blade by rocking adjustment upon the convex head of the support member.

5. In apparatus for grooving cards and the like, a housing having a head portion and a base portion; a platen carried on said base portion; a ram reciprocably mounted in the head portion of said housing for movement generally vertically of said platen; a generally V-shaped cutter blade on said ram movable into engagement with said platen for cutting of cards disposed thereon; an elongate pilot pin in said ram extending through said cutter blade and engageable in the holes of cards supported on said platen for alignment thereof, said pilot pin having an enlarged head extending rearwardly of the platen; a spring in said ram having one end engaged with the center portion of said pilot pin head and the other end attached to the lower portion of said ram, said spring biasing said pilot pin downwardly towards said platen and supporting the pin for pivotal movement relative to said ram; a lever pivotally mounted in said ram and engageable with said pilot pin head for retraction thereof against the biasing spring pressure in the at-rest position of the apparatus and disengageable from said pilot pin head during reciprocation of the ram towards said platen to release said pilot pin and allow it to rapidly precede the cutter blade and seat in the hole of cards to be grooved; a stop in the head portion of said housing engageable with the rearward portion of the pilot pin head after the pin has seated in the hole of the cards, said stop causing elongation of the spring during further reciprocative movement of the ram towards said platen to produce a pivotal moment upon the lower end of said pilot pin rearwardly of the platen for ejection of cards chip notched out by the cutting blade; and drive means for reciprocating said ram to drive said cutter blade through cards disposed upon said platen.

6. The device of claim 5 wherein said cutter blade has a cutting edge which is beveled inwardly at its apex and beveled outwardly over the remainder thereof, said pilot pin extends adjacent the apex of the cutter blade and is biased away from the apex of the cutting blade when ejecting the card chips, whereby the cards to be cut are maintained taut by the forward pressure exerted by the rearward bevel of the apex of the cutting blade and by the rearward pressure caused by the pivotal tension on the pilot pin caused by engagement of its head with said stop.

7. In apparatus for grooving cards and the like, a housing having a base portion and a head portion; a platen resiliently supported on said base portion; a ram reciprocably mounted in said head portion of the housing for movement generally vertically towards said platen; a generally V-shaped cutter blade on said ram movable into engagement with said platen for cutting of cards disposed thereon; pilot pin means carried by said ram for aligning cards to be cut and for ejection of the card chips formed by the grooving operation; and drive means for reciprocating said ram to drive said cutter blade through cards disposed on said platen, said drive means including an operating shaft in the head portion of said housing extending transversely of said ram, a drive collar on said shaft, an upper toggle link pivotally supported at one end on said housing and at its other end pivotally connected to said drive collar, a lower toggle link pivotally connected at one end to said drive collar at a point diametrically opposite said pivotal connection for the upper toggle link and at its other end to the upper portion of said ram, a spring fastened at one end to said shaft and at its other end to said housing, and means for rotating said operating shaft to pivot said drive collar about said upper toggle link and move it downwardly towards said base portion to elongate said lower toggle link and drive said ram towards said platen, said spring being elongated by said movement of the operating shaft for return of the drive collar to the at-rest position.

8. In an apparatus for grooving cards and the like, the combination comprising: a metal platen having a cutting face, a ram mounted for movement towards and away from said platen, a cutter blade on said ram having a cutting edge movable into engagement with said cutting face of the platen for cutting cards disposed thereon, means carried by said ram for aligning cards to be cut, drive means for moving said ram to drive said cutter blade through cards carried on said platen and resilient means supporting said platen for rocking movement to permit self-alignment of the platen with said cutting face disposed substantially parallel to said cutting edge of the blade.

9. An apparatus for grooving cards and the like comprising in combination a platen, a ram mounted for movement towards and away from said platen, cutting blade means on said ram movable into engagement with said platen for cutting cards disposed thereon, a pilot pin extending generally in the direction of movement of the ram and having one end receivable in holes of cards supported on said platen to be grooved, the other end of the pilot pin having an enlarged head, a spring having one end connected to said pilot pin head and the other end attached to a lower portion of said ram to thereby bias said pilot pin downwardly and to support the pilot pin for pivotal movement relative to said ram, a lever pivotally mounted to said ram for movement between a first position wherein said lever engages said pilot pin head to maintain said pilot pin in a raised position against the bias of said spring and a second retracted position away from the pilot pin head to thereby permit said pilot pin to descend under the action of said spring, means for retracting said lever into the second position thereof so as to permit the pilot pin to be received in the holes of cards to be grooved prior to the engagement of the cards by said cutting blade means, a stop means engageable with the pilot pin head after the pilot pin has been received in the holes of the cards causing elongation of said spring during further downward movement of the ram toward said platen to thereby cause said pilot pin to pivot about said stop means after the cards have been grooved so as to eject card chips notched out by the cutting blade means, and a drive means for reciprocating said ram to drive said cutting blade means through cards disposed upon said platen.

10. In an apparatus for notching cards and the like, the combination comprising: a platen, a ram mounted for movement towards and away from said platen, notching means on said ram movable into engagement with said platen for notching cards disposed thereon, an elongated pilot pin receivable in holes of cards disposed on said platen to be notched, spring means connecting said pilot pin to said ram for relative reciprocable and pivotal movement, means for energizing and releasing the spring means to bias said pilot pin toward said notching means and to move said pilot pin downwardly through the holes of the cards prior to the engagement of the cards by the notching means, and a stop means for limiting the downward movement of the pilot pin as the ram is descending towards said platen to re-energize said spring means to bias said pilot pin about said stop means and away from said notching means after all the cards have been notched to thereby eject the card chips.

11. In an apparatus for notching cards and the like, the combination comprising: a platen, a ram mounted for movement towards and away from said platen, a generally V-shaped cutter blade mounted on said ram for movement into engagement with the platen to thereby notch the cards disposed thereon, a pilot pin receivable in the holes of cards supported on said platen for alignment of the cards, spring means connecting said pilot pin to said ram, release means for rendering said spring means effective to bias said pilot pin toward the apex of said cutter blade and through the holes of all the cards prior to the engagement of the cards by said cutter blade, the cutting edge of said cutter blade being bevelled inwardly at its apex to urge the cutter blade in the direction of the pilot pin during the cutting of the cards so that the cutter blade will intersect the holes in the cards, and means for pivoting the pilot pin away from the cards after the cards have been notched for ejecting card chips cut out by the cutter blade.

12. An apparatus for notching cards and the like, the combination comprising: a platen, a ram mounted for movement toward and away from said platen, a generally V-shaped cutter blade mounted on said ram for movement toward said platen to thereby notch cards positioned thereon, a pilot pin receivable in the holes of the cards positioned on said platen for alignment of the same, the cutter blade being bevelled toward the pin at its apex to provide a cutting edge to pass between the edge of the hole and the pilot pin to produce card chips which are laterally removable from the pilot pin.

References Cited by the Examiner

UNITED STATES PATENTS

| | | | |
|---|---|---|---|
| 130,486 | 8/72 | Cornell | 83—630 |
| 593,795 | 11/97 | Willbur | 83—630 |
| 1,493,994 | 5/24 | Le Fere | 83—567 |
| 2,103,120 | 12/37 | Sabo et al. | 83—567 |
| 2,307,617 | 1/43 | Braun | 83—33 |
| 2,405,598 | 8/46 | Miller | 83—659 |
| 2,614,631 | 10/52 | Bone | 83—129 |
| 2,768,686 | 10/56 | Feiertag | 83—659 |
| 2,857,966 | 10/58 | Sarka | 83—33 |
| 2,874,749 | 2/59 | Brink | 85—50 |

ANDREW R. JUHASZ, *Primary Examiner.*

CARL W. TOMLIN, HUNTER C. BOURNE, JR., WILLIAM W. DYER, JR., *Examiners.*